US007236749B2

(12) United States Patent
Reyes

(10) Patent No.: US 7,236,749 B2
(45) Date of Patent: Jun. 26, 2007

(54) STUCK MICROPHONE DESELECTION SYSTEM AND METHOD

(75) Inventor: Joe Reyes, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 220 days.

(21) Appl. No.: 10/687,443

(22) Filed: Oct. 15, 2003

(65) Prior Publication Data

US 2005/0085252 A1 Apr. 21, 2005

(51) Int. Cl.
*H04B 1/44* (2006.01)
*H04B 7/00* (2006.01)
*H04Q 7/20* (2006.01)

(52) U.S. Cl. ........................................ 455/78; 455/517

(58) Field of Classification Search ................ 455/519, 455/431, 78, 517

See application file for complete search history.

(56) References Cited

U.S. PATENT DOCUMENTS 3,500,459 A * 3/1970 Battin et al. .................. 455/78
4,366,578 A * 12/1982 Foster et al. .................. 455/79
4,549,309 A * 10/1985 Corrigan ...................... 455/78
4,551,854 A * 11/1985 Rutty et al. ................... 455/78
4,833,725 A * 5/1989 Teetor ..................... 455/67.13
4,932,071 A * 6/1990 Arndt et al. ............... 340/7.58
5,148,159 A * 9/1992 Clark et al. ............ 340/825.22
5,960,362 A * 9/1999 Grob et al. ................. 455/527
5,983,114 A * 11/1999 Yao et al. ................... 455/509
6,160,496 A * 12/2000 Scheuer ...................... 340/945
6,963,743 B1 * 11/2005 James ........................ 455/431
2003/0154008 A1 * 8/2003 Nakamura .................. 701/29

FOREIGN PATENT DOCUMENTS

GB 2198912 A * 6/1988
JP 55093327 A * 7/1980

OTHER PUBLICATIONS

JP 55-093327. Patent Abstracts of Japan. English Abstract Translation.*

* cited by examiner

*Primary Examiner*—William Trost
*Assistant Examiner*—Marivelisse Santiago-Cordero
(74) *Attorney, Agent, or Firm*—McDonnell Boehnen Hulbert & Berghoff LLP

(57) ABSTRACT

Methods and apparatus are provided for handling a STUCK-ON microphone push-to-talk (PTT) switch. The apparatus comprises an input device receiving the PTT output, switches for selecting a radio, and a controller that receives this information and determines whether the PTT switch is STUCK-ON. Until STUCK-ON occurs, the controller passes the microphone signal and a PTT initiated TRANSCVER-ON command to the radio causing it to transmit. When STUCK-ON occurs, the state of the PTT switch is ignored and the transmitter shut off. The status of other PTT switches and radios are not affected. In the method, the active PTT signal results in a TRASNCVR-ON command to the transmitter until a PTT-ON timer reaches a predetermined critical value Tc, whereupon the PTT-ON signal is blocked, the transmitter returned to stand-by and an alarm turned on to warn the pilot of the stuck PTT switch.

15 Claims, 4 Drawing Sheets

STUCK MICROPHONE DESELECTION SYSTEM AND METHOD

TECHNICAL FIELD

The present invention generally relates to a system and method for communication from vehicles, and more particularly to a system and method for handling a stuck microphone condition in aircraft.

BACKGROUND

Modern aircraft are generally equipped with several means of radio communication between the pilot or other aircraft personnel and ground stations or other aircraft. For convenience of explanation the present invention is described in the context of pilot communication but persons of skill in the art will understand that it applies to any other flight crewmembers and even to passengers who may have access to communication facilities on the aircraft. Typically the pilot has several radios and several microphones that he or she may use. The pilot selects a particular microphone and radio by means of one or more switches on a control panel. The selected microphone itself is typically activated by depressing a 'Push-To-Talk' (PTT) switch whereupon the radio to which the microphone is coupled will transmit whatever message the pilot speaks into the microphone. The PTT may be a part of the microphone itself, as for example with a hand held mike or it may be remotely located. Pilots often wear a headset with a boom mike whose PTT switch is located on the aircraft control yoke. These are non-limiting examples of typical arrangements. The particular microphone and PTT switch arrangement is not critical.

Because of safety considerations it is important that a stuck PTT switch in a particular aircraft not preempt the particular radio channel being used, e.g., cause that aircraft's transmitter to stay on for an extended period of time, thereby preventing others sharing the same channel from communicating. A stuck PTT switch condition occurs when a PTT switch has been depressed or otherwise activated for a time exceeding a preset threshold Tc. A stuck PTT switch condition can result from several causes as, for example: (i) the pilot has held the PTT switch closed for a time exceeding Tc, or (ii) mechanical or electrical failure has occurred which prevents the PTT switch from returning to its OFF state. Typical present day avionics systems do not distinguish between these conditions. In either case, once Tc is exceeded the avionics system deactivates all of the pilot's PTT switches so that further transmission is precluded and the radio channel is cleared for use by others. The pilot's PTT switches remain disabled until the stuck-switch condition is cleared. Even when only one of the pilot's available PTT switches is 'stuck', for example on a hand mike, his other PTT switch, e.g. for a boom mike, is also disabled. Thus, when a 'stuck PTT switch' condition occurs in the prior art, all of the pilot's normal means of communication are disabled. This usually does not affect the copilot's communication capability in a dual control aircraft with duplicate microphones, PTT switches, and so forth. In addition, per RTCA/DO-207 the pilot usually has a safety over-ride switch that permits essential communication by the pilot in emergencies. This over-ride switch must be a protected switch so that it cannot be accidentally left activated. This arrangement while workable is inconvenient and more flexible means of dealing with a stuck PTT switch condition are needed.

Accordingly, it is desirable to provide a 'stuck PTT switch' response that allows non-stuck PTT switches and corresponding mikes to be used so that normal communications can continue on the alternative systems, despite the 'stuck switch' condition on one of the available mikes. In addition, it is desirable to provide this improved capability with minimum cost and little or no added complexity. Furthermore, other desirable features and characteristics of the present invention will become apparent from the subsequent detailed description and the appended claims, taken in conjunction with the accompanying drawings and the foregoing technical field and background.

BRIEF SUMMARY

Method and apparatus are provided for handling a STUCK-ON microphone push-to-talk (PTT) switch. The apparatus comprises a radio for transmitting a signal derived from a microphone, a PTT switch having an ON/OFF output and an associated microphone for providing a communication signal to the radio, switches for selecting the radio from one or more available, and a controller coupled to the selected microphone and PTT switch, that determines whether the PTT switch is STUCK-ON. Until STUCK-ON occurs, the controller passes the microphone signal and a PTT-ON initiated TRANSCVER-ON command to the radio causing it to transmit When STUCK-ON occurs, the state of the PTT switch is ignored (e.g., it is disabled or deselected) and the transmitter shut off. The status of other PTT switches and radios are not affected.

A method is provided wherein a PTT-ON signal from the selected PTT results in a TRASNCVR-ON command sent to the transmitter so that it transmits a communication signal based on the microphone output, and a timer started. When the PTT-ON timer reaches a predetermined critical value Tc, the PTT-ON signal is rendered ineffective, that is, blocked, disabled or deselected. The transmitter is returned to standby, the timer reset and an alarm turned on to warn the pilot of the stuck PTT switch, without affecting the response of other PTT switches. In the preferred embodiment, the PTT output status is checked and if it returns to PTT-OFF, then the alarm is cancelled and the PTT output is re-enabled, i.e., no longer blocked. If the PTT output changes to PTT-OFF before the timer reaches Tc, then the transmitter is turned off and the timer reset.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein the words "radio" and "transceiver" (abbreviated "TRANSCVR"), whether upper or lower case, are used interchangeably to refer to electronic equipment capable of transmitting a radio communication signal. The words "receive" and "standby" in reference to such radios are also used interchangeably to describe the condition when the radio is not transmitting. With respect to a PTT switch, the term "active" is intended to mean that the switch output is ON, that is, commanding a transmit action, and the term "enabled" is intended to mean that the switch output is not being blocked from the TRANSCVR, that is, it is not disabled or deselected.

Figure 1:
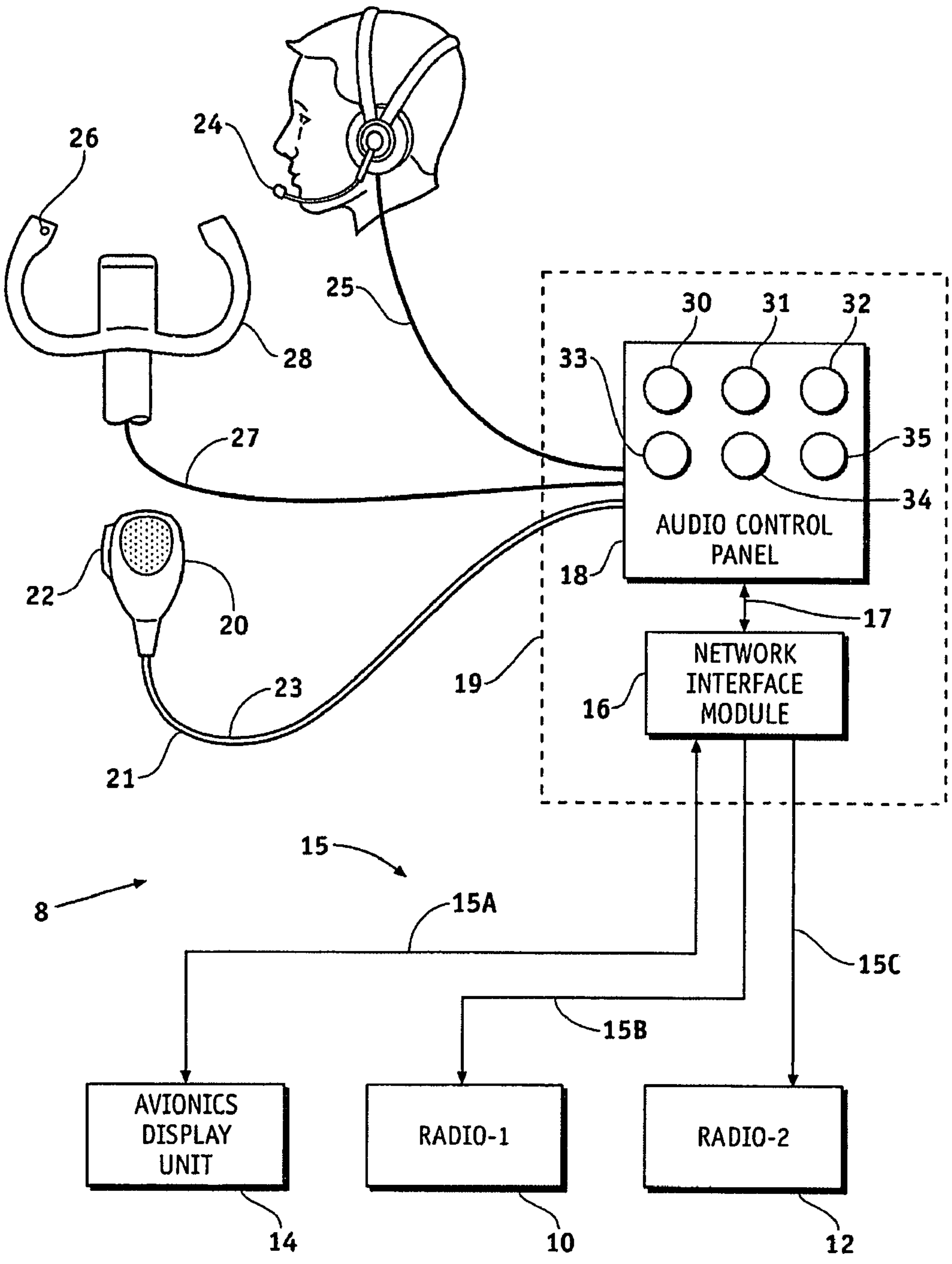
FIG. 1 is a simplified schematic diagram of an aircraft communication system according to the present invention.

FIG. 1 is a simplified schematic diagram of aircraft communication system 8 according to the present invention. System 8 comprises one or more radios or transceivers (TRANSCVR) 10, 12, avionics display unit (ADU) 14 and network interface module (NIM) 16, respectively coupled by communication bus 15 which includes at least buses 15A, 15B, and 15C. Network interface module (NIM) 16 is coupled to audio control panel (ACP) 18 by another communication bus 17. Audio control panel (ACP) 18 has a number of switches, for example switches 30-35, used by the pilot to select the radio transceivers (TRANSCVR) for communication. Coupled to ACP 18 are, for example, hand held mike 20 with integral PTT switch 22 and boom mike 24 and its corresponding PTT switch 26. Switch 26 is conveniently located on aircraft control yoke 28. Cable 21 couples the audio signal of mike 20, and cable 23 couples the PTT signal for mike 20, to ACP 18. Similarly, cable 25 couples the audio signal from boom mike 24, and cable 27 couples the corresponding PTT signal from PTT switch 26 on control yoke 28, to ACP 18.

Audio control panel (ACP) 18 receives the PTT and audio signals from the respective microphone selected by the pilot. The pilot uses panel switches 30-35 to select the radio (TRANSCVR) through which he or she desires to transmit. With the PTT signal, and the selected panel switch, ACP 18 has sufficient information to send over communication bus 17 to NIM unit 16 a PTT activation signal, an address for the desired radio and, for example, a digitized audio signal corresponding to the audio input received from the selected microphone. NIM 16 conveniently but not essentially includes an audio processor card (APC) coupled to bus 17. The APC conveniently receives from bus 17 the PTT signal, the digitized audio signal, and the radio address and issues a corresponding PTT signal and sends an audio signal directly to the selected radio 10 or 12 depending on the address. The PTT signal issued by NIM 16 (e.g., TRANSCVR-ON) over buses 15B or 15C, corresponds to the signal required by radio 10 or radio 12 to switch it from the receive (or standby mode) to the transmit mode.

When ACP 18 detects that a 'stuck PTT switch' condition has occurred, it deactivates or deselects the PTT signal going to NIM 16 according to which of the available PTT switches is in the 'stuck' condition. NIM 16 in turn deactivates the PTT signal going to the selected radio. At substantially the same time, ACP 18 sends an error message over bus 17 to NIM 16 which relays the message to avionics display unit (ADU) 14 via bus 15A to cause ADU 14 to illuminate a tell-tale warning light or other alarm to warn the pilot that a stuck PTT switch condition has occurred and, preferably, which of the available PTT switches is 'stuck'. This allows the pilot to recycle the switch if he or she has held it down too long or to change to another mike and PTT switch if the 'stuck switch' condition is caused by a mechanical or electrical failure. Only the microphone experiencing the 'stuck switch' condition is disabled. The other microphones and PTT switch(es) are left unaffected and thus, may continue to be used by the pilot in a normal manner.

Figure 2:
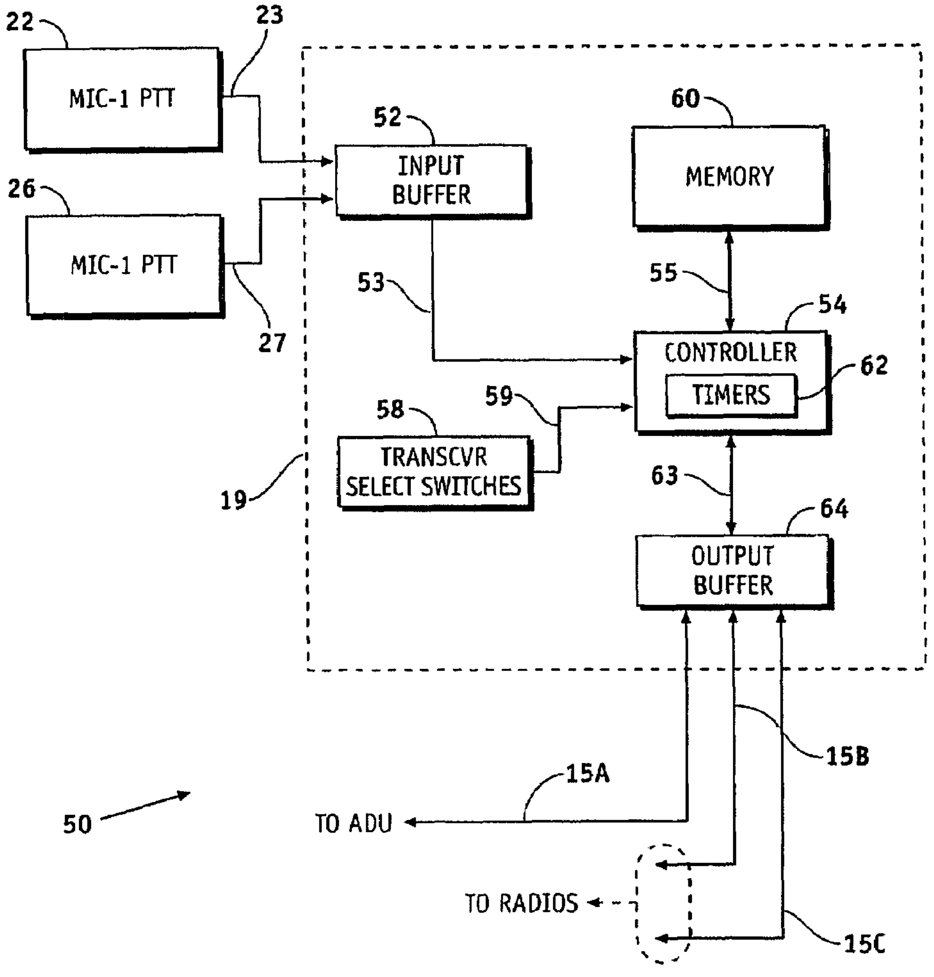
FIG. 2 is a simplified schematic diagram of a portion of the system of FIG. 1 showing further details.

FIG. 2 is a simplified schematic diagram of electronic subsystem 50 showing further details of the part of system 8 within outline 19 of FIG. 1. For conveniance of explanation handheld mike PTT switch 22 is identified as corresponding to MIC-1 and boom mike PTT switch 26 is identified as corresponding to MIC-2, but this is not intended to be limiting. While subsystem 50 within outline 19 is shown in FIG. 1 as being partitioned into ACP 18 and NIM 16, this is merely for convenience of explanation and is not essential. As far as dealing with a 'stuck PTT' condition is concerned, it does not matter if a particular function is performed within ACP 18 or NIM 16. Accordingly, FIG. 2 provides a simplified schematic diagram of the combined function of ACP 18 and NIM 16 with respect to dealing with a 'stuck PTT' condition.

Subsystem 50 receives PTT signals from MIC-1 PTT switch 22 and from MIC-2 PTT switch 26 over leads 23, 27 respectively. The nature of the PTT signal can be +/−Vcc, Ground, Vbb, or whatever voltage, current or impedance level is convenient to indicate "switch depressed" or "switch released", i.e., PTT-ON or PTT-OFF. Persons of skill in the art will understand how to choose the respective ON and OFF levels to suit their particular application. As used herein with respect to a PTT switch, "ON" is intended to refer to the condition where signal transmission is desired (e.g., PTT switch depressed), and "OFF" to refer to the condition where signal transmission is not intended (e.g., PTT switch released).

The PTT signals from MIC-1 and MIC-2 are conveniently received by INPUT BUFFER 52 over leads or wires 23, 27. INPUT BUFFER 52 conveniently adjusts the ON/OFF signals from the PTT switches to suit whatever voltage or current levels are appropriate for processing by subsequent elements of subsystem 50. INPUT BUFFER 52 communicates the state of the PTT switches (i.e., ON or OFF) over bus 53 to CONTROLLER 54. CONTROLLER 54 also receives inputs from TRANSCVR SELECT SWITCHES 58 (e.g., switches 30-35 of FIG. 1) over bus 59 so that it knows which of RADIO-1 and RADIO-2 have been selected by the pilot. The arrangement shown in FIG. 2 whereby the inputs from BUFFER 52 are received by CONTROLLER 54 has the advantage that it allows CONTROLLER 54 to continually determine the state of the PTT switches, but this is not essential.

CONTROLLER 54 is coupled to MEMORY 60 via bus 55 and to OUTPUT BUFFER 64 by bus 63. MEMORY 60 conveniently stores program instructions for CONTROLLER 54 as well as intermediate data variables and predetermined constants such as Tc. OUTPUT BUFFER 64 is coupled to RADIOS 10, 12 over buses 15B, 15C, respectively. OUTPUT BUFFER 64 conveniently provides level translation or whatever other remaining signal manipulation is needed to correctly interface a PTT signal or equivalent transmitter command (e.g., TRANSCVR-ON or TRANSCVR-OFF), audio signal and RADIO address signal to the destination RADIO.

CONTROLLER 54 conveniently contains one or more TIMERS 62, or equivalent timing functions (e.g., software timers). CONTROLLER 54 receives the PTT switch signal (e.g., PTT-ON) from the selected MIC and the identification of the selected RADIO. CONTROLLER 54 then starts and monitors a TIMER, performs whatever digitization, compression or other audio signal manipulation is needed for the selected RADIO and sends a TRANSCVR-ON command, processed audio information and RADIO address to OUTPUT BUFFER 64, as long as the lapsed time t since receiving the PTT-ON signal is less than the predetermined value Tc stored, for example, in MEMORY 60. When t≧Tc, then the PTT-ON input is deselected, disabled or ignored, CONTROLLER 54 no longer sends the TRANSCVR-ON command to OUTPUT BUFFER 64 and the selected RADIO 10, 12 stops transmitting and returns to standby mode. When CONTROLLER 54 determines that t ≧Tc, it sends an ALARM signal via OUTPUT BUFFER 64 to ADU 14 over bus 15A to alert the pilot that a 'stuck PTT switch' condition exists, as discussed previously in connection with FIG. 1. An error flag may also be sent to MEMORY 60 to indicate that the particular PTT switch concerned has reached a 'stuck switch' condition so that its signals are ignored until the 'stuck switch' condition is cleared. This is convenient but not essential. The 'stuck switch' alarm and flag are maintained until the 'stuck switch' status is cleared, as for example, by the pilot recycling the PTT switch if it has not failed. If the PTT switch has a mechanical or electrical failure, then the alarm and flag continue until the system is powered down and/or the defective PTT switch or other defective part is replaced.

Figure 3:
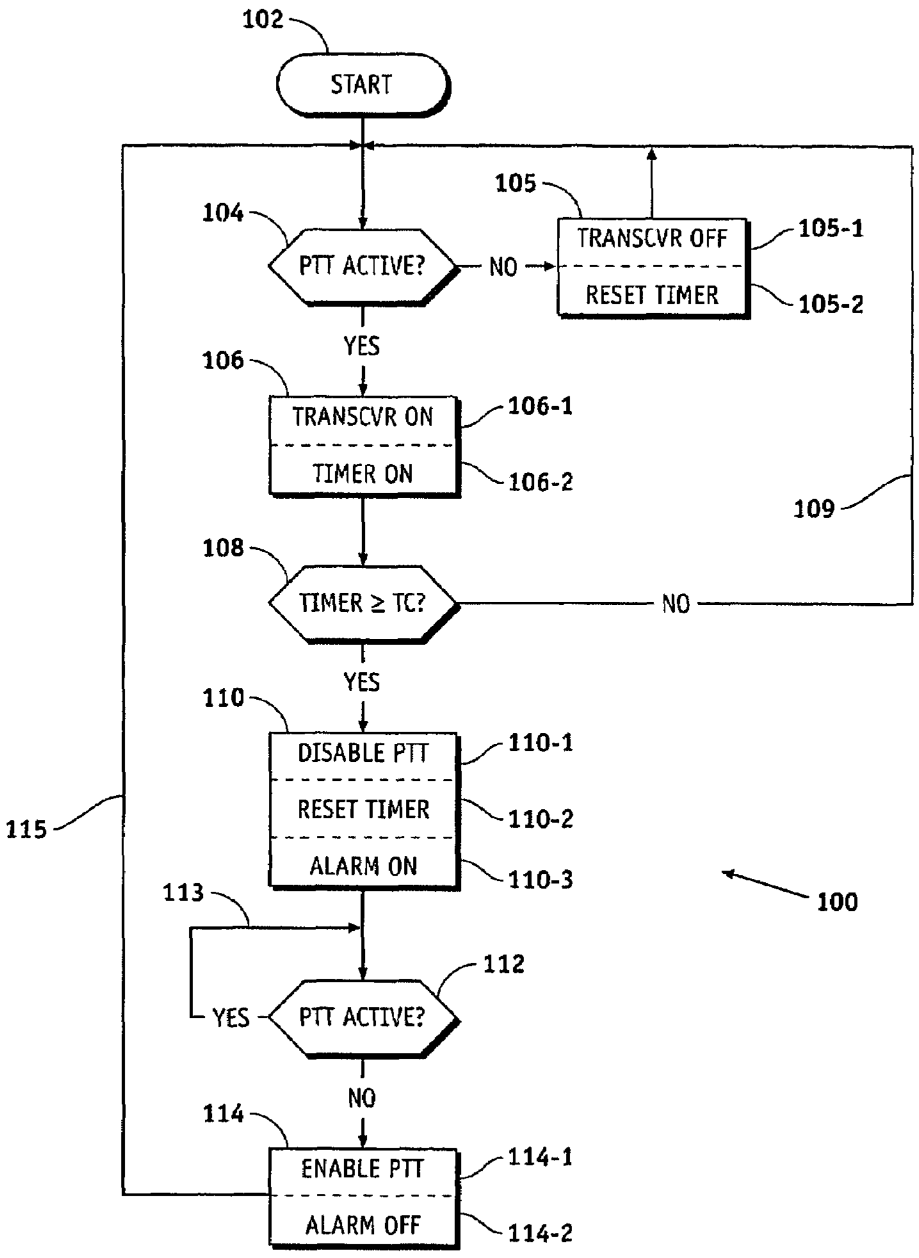
FIG. 3 is a simplified flow chart illustrating the method of the present invention.

FIG. 3 is a simplified flow chart illustrating method 100 of the present invention. As used herein, "PTT" refers to any push-to-talk switch, e.g., PTT-1, PTT-2 or others that may be present in the system. Commencing with START 102, which usefully occurs when system 8 is powered up, subsystem 50 executes PTT ACTIVE ? query 104 wherein it is determined whether or not the PTT switch is ON, that is, has the pilot depressed PTT switch 22 on hand-mike 20 or equivalent. This is conveniently accomplished by CONTROLLER 54 detecting whether a signal on input line 23, 27 corresponds to the PTT-ON state. If the outcome of query 104 is YES (TRUE) then step 106 is executed. Step 106 comprises TRANSCVR-ON sub-step 106-1 and TIMER-ON sub-step 106-2. Steps 106-1 and 106-2 may be executed in either order. In step 106-1 the TRANSCVR-ON command is coupled from subsystem 50 to the appropriate RADIO transceiver (TRANSCVR) e.g., radio 10 or 12 selected by the pilot. This causes the RADIO to switch from the receive or standby to the transmit mode. Sub-step 106-2 turns on timer 62 (see FIG. 2), which begins to court-up to Tc or to count down from Tc to zero. Either approach is useful. While the timing function is described herein as a counter, this is merely for convenience of explanation and persons of skill in the art will understand that any type of timing function may be employed. As used herein, the words "counter" and "timer" are intended to include these other alternatives.

TIMER≧TC ? query 108 is then executed wherein it is determined whether or not the running time from step 106-2 has reached the predetermined critical time value Tc. If the outcome of query 108 is NO (FALSE) then method 100 loops back to START 102 and query 104 via path 109. As long as the PTT switch is active (query 104=YES (TRUE)) and the counter running time is less than Tc (query 108=NO (FALSE)), then method 100 will repeat steps 104, 106, 108 and TRANSCVR-ON will remain coupled to the appropriate radio 10, 12 thereby holding the radio in the transmit state. If the pilot releases the PTT switch before time reaches Tc, then on the next loop-back via pathway 109, the outcome of query step 104 becomes NO (FALSE) and step 105 is executed. In sub-step 105-1 the TRANSCVR is turned off and in sub-step 105-2 the timer is reset to the start count, as the method loops back to the beginning, Sub-steps 105-1 and 105-2 may be performed in either order.

If the outcome of query 108 is YES (TRUE) indicating that the time count has exceeded the predetermined critical value Tc, then step 110 is executed. In sub-step 110-1, the PTT switch is disabled, that is, TRANSCVR-ON is no longer coupled to radio 10, 12, thereby causing radio 10, 12 to cease transmitting and revert to the receive or standby state. In sub-step 110-2, timer 62 is reset to its starting value and in sub-step 110-3 an alarm message is sent along bus 15A to ADU 14 causing the appropriate warning or caution light to illuminate or other alarm to turn on, alerting the pilot to the 'PTT-Stuck' condition and, preferably which PTT switch is in the 'stuck' state. Steps 110-1, 110-2, 110-3 may be performed in any order. Following step 110, PTT ACTIVE ? query 112 is executed to determine whether the PTT switch is still activated (e.g., the PTT switch is depressed by the pilot or there is a continuing mechanical or electrical failure in the ON-STATE). If the outcome of query 112 is YES (TRUE) meaning that the PTT switch is still stuck in the ON-STATE, method 100 loops back via path 113 and query 112 is repeated.

If the outcome of query 112 is NO (FALSE) then step 114 is executed. In step 114-1, the PTT switch is enabled again, that is, the PTT-ON state is no longer prevented from reaching radio 10, 12 and if the PTT switch is subsequently activated, a TRANSCVR-ON command will be coupled to radio 10 or 12 depending on which has been selected by the pilot. In step 114-2 the alarm set in step 110-3 is disabled, e.g., turned OFF, and operation of the PTT switch is once again fully normal. Steps 114-l,and 14-2 may be performed in either order. Following step 114, method 100 loops back via path 115 to START 102 and query 104 wherein system 8 once again monitors the status of the PTT switch. While method 100 has been described for a single PTT switch, this is merely for convenience of explanation and persons of skill in the art will understand that it applies to any of the PTT switches coupled to system 8.

Figure 4:
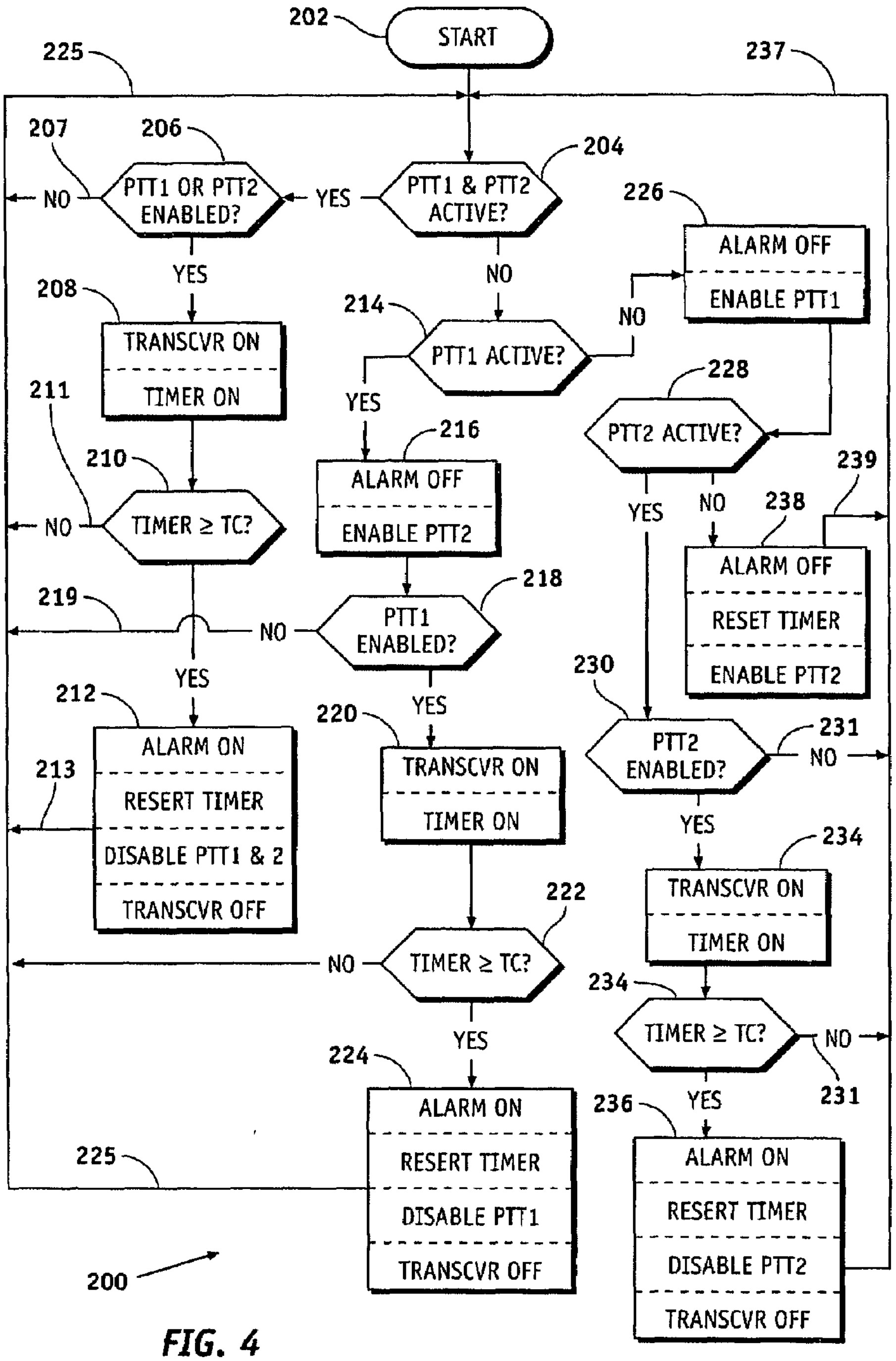
FIG. 4 is a simplified flow chart illustrating a further embodiment of the method of the present invention.

FIG. 4 is a simplified flow chart illustrating method 200 according to a further embodiment of the present invention, wherein two PTT switches are being employed, e.g., PTT-1 and PTT-2. For convenience of explanation these are abbreviated here and in FIG. 4 as PTT1 and PTT2. Commencing with START 202, query 204 is executed wherein it is determined whether or not both PTT1 and PTT2 are in the "ON" state (e.g., PTT1 & PTT2 ACTIVE?). If the answer to query 204 is YES (TRUE) then query 206 is executed wherein it is determined whether or not either of PTT1 or PTT2 is in the enabled state (e.g., PTT1 OR PTT2 ENABLED ?), that is, not disabled because of a previous, uncleared "STUCK-ON" condition (see the discussion of FIG. 3). If the outcome of query 206 is NO (FALSE) then method 200 returns to start 202 via path 207.

If the outcome of query 206 is YES (TRUE) indicating that one or the other of PTT1 or PTT2 is enabled (capable of working), then step 208 is executed wherein the timer is started (TIMER ON) and the corresponding transceiver is turned on (TRANSCVR ON). These sub-steps may be performed in either order. Following step 208, query 210 is executed wherein it is determined whether or not the timer has counted to or exceeded its critical value (e.g., TIMER≧Tc ?). If the outcome of query 210 is NO (FALSE) then method 200 returns to start 202 and initial query 204 via path 211. The transmitter remains in the ON-STATE as long as the PTT switch continues to be depressed and t<Tc. If the outcome of query 210 is YES (TRUE) then step 212 is executed wherein the alarm is turned on (e.g., ALARM ON), the timer is reset (e.g., RESET TIMER), both PTT1 and PTT2 are disabled (e.g., DISABLE PTT1&2), and the active transceiver is turned off (TRANSCVR OFF), that is switched back to the receive or standby state. These sub-steps may be executed in any order. The method then returns to start 202 and initial query 204 via path 213.

Returning now to query 204, if the outcome of query 204 is NO (FALSE), then query 214 is executed wherein it is determined whether PTT1 is active (e.g., PTT1 ACTIVE ?), that is, is PTT1 depressed. If the outcome of query 214 is YES (TRUE) then step 216 is executed wherein the alarm is turned off (e.g., ALARM OFF) and PTT2 is enabled (e.g., ENABLE PTT2), that is, placed in a state where it is capable of activating a transmitter if pressed. Query 218 is then executed wherein it is determined whether or not PTT1 is enabled (e.g., PTT1 ENABLED ?), that is capable of functioning to activate a transmitter. If the outcome of query 218 is NO (FALSE) then the method returns to start 202 and initial query 204 via path 219. If the outcome of query 218 is YES (TRUE) then step 220 is executed wherein the timer is started (e.g., TIMER ON) and the radio is put into the transmit mode (e.g., TRANSCVR ON). Following step 220, "TIMER≧Tc ?" query 222 is executed in the same manner as for query 210. If the outcome of query 222 is NO (FALSE) then the method returns to start 202 and initial query 204 via path 223. If the outcome of query 222 is YES (TRUE) then step 224 is performed wherein the alarm is turned ON (e.g., ALARM ON), the timer is reset (e.g., RESET TIMER), PTT1 is disabled (e.g., DISABLE PTT1), that is, rendered ineffective, and the corresponding transceiver is switched from the transmit state back to the receive or standby state (e.g., TRANSCVR OFF). These sub-steps may be performed in any order. Following step 224, the method returns to start 202 and initial query 204 via path 225.

Returning now to query 214, if the outcome of query 214 is NO (FALSE) then step 226 is executed wherein the alarm is turned off (e.g., ALARM OFF) and PTT1 is enabled (e.g., ENABLE PTT1). Query 228 is then executed wherein it is determined whether or not PTT2 is active (e.g., PTT2 ACTIVE ?). If the outcome of query 228 is NO (FALSE) then step 238 is executed where the alarm is turned off (e.g., ALARM OFF), the timer is reset (e.g., RESET TIMER), and PTT2 is enabled (e.g., ENABLE PTT2). Thereafter, the method returns to start 202 and initial query 204 via path 239. If the outcome of query 228 is YES (TRUE) then query 230 is executed wherein it is determined whether or not PTT2 is capable of working (e.g., PTT2 ENABLED ?). If the outcome of query 230 is NO (FALSE) then method 200 returns to start 202 and initial query 204 via path 231. If the outcome of query 230 is YES (TRUE) then step 232 is executed wherein the timer is started (e.g., TIMER ON) and the selected radio is put into the transmit mode (e.g., TRANSCVR ON). Following step 232, "TIMER≧Tc ?" query 234 is executed in the same manner as for queries 210 and 222, that is, has the timer counted to or past the predetermined value Tc. If the outcome of query 234 is NO (FALSE) then the method returns to start 202 and initial query 204 via path 235. If the outcome of query 234 is YES (TRUE) then step 236 is performed wherein the alarm is turned ON (e.g., ALARM ON), the timer is reset (e.g., RESET TIMER), PTT2 is disabled (e.g., DISABLE PTT2), that is, rendered ineffective, and the corresponding transceiver is switched from the transmit state back to the receive or standby state (e.g., TRANSCVR OFF). These sub-steps may be performed in any order. Following step 236, the method returns to start 202 and initial query 204 via path 237.

Among other things, the above-described method has the advantage that when a particular PTT switch enters a STUCK-ON state, that only the communication path corresponding to that particular PTT switch is disabled. The remaining PTT switches remain active and able to provide communications in the normal manner. This is a significant improvement over the prior art wherein a single PTT failure disabled all PTT switches coupled to the same ACP. Further advantages of the present invention are that: (1) it can automatically monitor and flag (and alarm) a stuck PTT switch even if it has not been selected by the pilot, and (2) it can continually poll stuck PTT switch status and reset it to an active state once the STUCK-ON condition is no longer present.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. An aircraft communication system, comprising:

a plurality of radios;

a plurality of push-to-talk (PTT) switches, each PTT switch having at least an ON position and an OFF position and configured to supply an ON/OFF signal representative of the position of the PTT switch; and a controller in operable communication with each radio and coupled to receive the ON/OFF signal from each PTT switch, the controller configured, in response to the ON/OFF signal, to (i) selectively enable one or more of the radios to transmit (ii) determine whether each PTT switch is stuck in the ON position and (iii) when a PTT switch is stuck in the ON position, to deselect the stuck PTT switch without affecting the activity of other PTT switches available to be coupled to the plurality of the radios such that the one or more of the radios remain operable via the other PTT switches.

2. The system of claim 1, further comprising: an input buffer coupled between each PTT switch and the controller and configured to supply buffered ON/OFF signals to the controller.

3. The system of claim 1, further comprising:

one or more timer circuits, each timer circuit configured to supply a time signal when at least one of the PTT switches is in the ON position, wherein the controller determines that a PTT switch is stuck in the ON position when the time signal indicates the PTT switch has been in the ON position for at least a predetermined time value.

4. The system of claim 3, further comprising:

a memory circuit in operable communication with the controller, the memory circuit having at least the predetennined time value stored therein.

5. The system of claim 1 further comprising:

a plurality of selection switches coupled to the controller, each selection switch configured to supply a radio selection signal, wherein the controller is further configured, in response to the radio selection signal, to determine which of the radios to selectively enable to transmit.

6. The system of claim 1, wherein the controller is further configured to supply an alarm signal when a PTT switch is determined to be stuck in the ON position, and wherein the system further comprises:

an aircraft display unit (ADU) in operable communication with the controller and configured to supply an alarm upon receipt of the alarm signal.

7. An apparatus for handling a STUCK-ON condition of a push-to-talk (PTT) switch coupled to a plurality of radio transmitters, comprising:

a PTT switch configured to supply a PTT ON/OFF signal;

a plurality of selection switches, each selection switch configured to supply a radio selection signal; and a controller coupled to the PTT switch, each of the selection switches, and each of the radio transmitters, and configured to:

(i) receive the PTT ON/OFF signal and the radio selection signal from each selection switch;

(ii) select one of the radio transmittersbased on the radio selection signal;

(iii) determine whether the PTT switch is in the STUCK-ON condition;

(iv) until the STUCK-ON condition occurs, supply either a TRANSMIT or a STANDBY command to the selected radio transmitter based on the PTT switch ON/OFF signal, to thereby cause the selected radio transmitter to transmit or not transmit, respectively; and (v) when the STUCK-ON condition occurs, ignore the PTT switch ON/OFF signal and place the selected radio transmitter in STANDBY without affecting the activity of other PTT switches available to be coupled to the selected radio transmitter such that the selected radio transmitter remains operable via other PTT switches.

8. The apparatus of claim 7, further comprising: an input buffer coupled between the PTT switch and the controller and configured to supply buffered ON/OFF signals to the controller.

9. The apparatus of claim 8, further comprising:

a timer circuit configured to selectively supply a time signal, wherein the controller determines that the STUCK-ON condition occurs when the time signal exceeds a predetermined time value.

10. The apparatus of claim 9, further comprising:

a memory circuit in operable communication with the controller, the memory circuit having at least the predetermined time value stored therein.

11. The aparatus of claim 7, wherein the controller is further configured to supply an alarm signal when a PTT switch is determined to be stuck in the ON position, and wherein the apparatus further comprises:

an aircraft display unit (ADU) in operable communication with the controller and configured to supply an alarm upon receipt of the alarm signal.

12. In a communication system having one or more push-to-talk (PTT) switches that each have at least an ON position and an OFF position, and one or more radio transmitters that may be selectively coupled to receive a signal representative of each PTT switch position, a method for dealing with a STUCK-ON condition of a PTT switch, the method comprising the steps of:

determining whether a PTT switch is in the STUCK-ON condition; and if so, inhibiting the signal representative of the position of the PTT switch that is in the STUCK-ON condition from being received by each radio transmitter without affecting the activity of other PTT switches available to be coupled to the one or more radio transmitters and such that the one or more radio transmitters remain operable via the other PTT switches.

13. The method of claim 12, wherein the step of determining whether the PTT switch is in the STUCK-ON condition comprises determining that the PTT switch has been in the ON position for a predetermined period of time.

14. The method of claim 12, further comprising the step of turning on an ALARM to notify a user that the STUCK-ON condition has occurred.

15. An audio control panel, comprising:

a controller adapted to receive an ON/OFF signal from each of a plurality of push-to-talk (PTT) switches having at least an ON position and an OFF position, the controller configured, in response to the ON/OFF signals, to (i) selectively supply one or more radio enable signals (ii) determine whether each PTT switch is stuck in an ON position and (iii) when a PTT switch is stuck in the ON position, to deselect the stuck PTT switch without affecting the activity of the other PTT switches and such that one or more radios available to be coupled to the plurality of PTT switches remains operable via the other PTT switches.

* * * * *

UNITED STATES PATENT AND TRADEMARK OFFICE

CERTIFICATE OF CORRECTION

PATENT NO. : 7,236,749 B2
APPLICATION NO. : 10/687443
DATED : June 26, 2007
INVENTOR(S) : Joe Reyes It is certified that error appears in the above-identified patent and that said Letters Patent is hereby corrected as shown below:

In Claim 4, replace “at least the predetennined time” with --at least the predetermined time--

Signed and Sealed this

Twentieth Day of November, 2007

JON W. DUDAS
*Director of the United States Patent and Trademark Office*